(12) United States Patent
Wang et al.

(10) Patent No.: US 11,473,994 B2
(45) Date of Patent: Oct. 18, 2022

(54) PORTABLE TESTER FOR A LEAKAGE RATE OF A CYLINDER IN AN AUTOMOBILE ENGINE

(71) Applicant: Yantai Huazheng Instrument Co., Ltd., Longkou (CN)

(72) Inventors: Zhigang Wang, Longkou (CN); Yanzhi Li, Longkou (CN); Tao Li, Longkou (CN)

(73) Assignee: Yantai Huazheng Instrument Co., Ltd., Longkou (CN)

( * ) Notice: Subject to any disclaimer, the term of this patent is extended or adjusted under 35 U.S.C. 154(b) by 58 days.

(21) Appl. No.: 17/185,719

(22) Filed: Feb. 25, 2021

(65) Prior Publication Data

US 2021/0348981 A1 Nov. 11, 2021

(30) Foreign Application Priority Data

May 9, 2020 (CN) .......................... 202010385995.3

(51) Int. Cl.
| | |
|---|---|
| *G01M 15/02* | (2006.01) |
| *G01M 3/26* | (2006.01) |
| *G01M 3/02* | (2006.01) |
| *G01M 15/08* | (2006.01) |

(52) U.S. Cl.
CPC .............. *G01M 3/26* (2013.01); *G01M 3/025* (2013.01); *G01M 15/02* (2013.01); *G01M 15/08* (2013.01)

(58) Field of Classification Search
CPC ....... G01M 3/025; G01M 15/02; G01M 15/08
See application file for complete search history.

(56) References Cited

U.S. PATENT DOCUMENTS

| | | | | |
|---|---|---|---|---|
| 5,471,400 A | * | 11/1995 | Smalley | G01M 3/26 702/51 |
| 2004/0182137 A1 | * | 9/2004 | Kang | G01M 3/025 73/40 |
| 2016/0201636 A1 | * | 7/2016 | Inada | F23Q 23/00 123/625 |
| 2020/0200644 A1 | * | 6/2020 | Alvarez | G01M 3/025 |
| 2021/0140843 A1 | * | 5/2021 | Rodriguez-Casiano | G01M 3/26 |
| 2021/0348981 A1 | * | 11/2021 | Wang | G01M 3/26 |
| 2022/0106879 A1 | * | 4/2022 | Hou | E21D 11/18 |

* cited by examiner

*Primary Examiner* — Eric S. McCall
(74) *Attorney, Agent, or Firm* — Fitch, Even, Tabin & Flannery, LLP (57) ABSTRACT

It is provided a portable tester for leakage rate of a cylinder of an automobile engine. The portable tester includes a shell; wherein a circuit board and a manifold body are provided in the shell; a throttle hole is provided inside the manifold body, the shell includes a front shell and a rear shell; a display and a control key are provided respectively at an upper end of and at a middle part of the front shell; the circuit board is provided with a decoding drive electrically connected with the display, and a single chip microcomputer unit is provided on the decoding drive and electrically connected with the control key; an air inlet connecter and an air outlet connector are provided at the lower end of the front shell. Two ends of the manifold body are provided with sensors electrically connected with the single chip microcomputer unit.

16 Claims, 8 Drawing Sheets

PORTABLE TESTER FOR A LEAKAGE RATE OF A CYLINDER IN AN AUTOMOBILE ENGINE

CROSS REFERENCE TO RELATED APPLICATION

This disclosure claims the priority of Chinese Patent Application No. 202010385995.3, entitled "Portable Tester for a Leakage Rate of a Cylinder in an Automobile Engine" filed with the Chinese Patent Office on May 9, 2020, which is incorporated herein by reference in its entirety.

TECHNICAL FIELD

The present disclosure relates to a portable tester for a leakage rate of a cylinder in an automobile engine, which belongs to the technical field of portable testing technology for a leakage rate of a cylinder in an automobile engine.

BACKGROUND ART

The existing portable detection instruments for leakage rate (air leakage amount) of a cylinder is a set of measurement system composed of two pointer pressure gauges, one pressure regulating valve, manifolds and throttle holes. The detection method is as follows: after connected to a compressed air source, closing a check valve, and adjusting the pressure regulating valve to enable readings of two gauges to be stable at 100 PSI; then connecting a cylinder with an instrument manifold, opening the check valve, adjusting the pressure regulating valve so that the readings of the gauge at front of the throttle hole remain at 100 PSI(P), and reading the value P' of the gauge behind the throttle hole; then recording the read value P' and calculating the leakage rate of the cylinder according to a formula.

The shortcomings of the prior art are as follows:

1. In order to meet a need of manual reading in the prior art, a pressure regulating valve needs to be adjusted repeatedly in process of detecting leakage rate in order to obtain a stable instrument reading.

2. Due to limitations of overload resistance capacity of a pointer gauge (generally only 110% of full scale), the prior art must protect the pointer pressure gauge through the pressure regulating valve. The pressure regulating valve system is an indispensable part of instrument system in the prior art.

3. In order to obtain a stable reading, in the prior art, there is a strict limit on pressure fluctuation range of supplied compressed air.

4. In the prior art, the system needs to be adjusted manually and repeatedly, and steps for reading and calculating values are complex.

5. The prior art has strict regulations on an order of manual operation, and a slight omission may cause permanent damage to the instrument itself.

6. Due to limitations of mechanical structure principle, drop resistance performance of the instruments in the prior art is poor. Generally, free drop from a height of 30 cm may cause damage to the instruments. As a portable instrument, impact or free drop is a high probability event.

SUMMARY

Regarding shortcomings existing in the prior art, it is provided a portable tester for a leakage rate of a cylinder of an automobile engine.

In order to solve the above technical problems, it is provided the following technical solutions:

It is provided the portable tester for the leakage rate of the cylinder in the automobile engine, including a shell. A circuit board and a manifold body are arranged in the shell, a throttle hole is arranged inside the manifold body, the shell includes a front shell and a rear shell. A display is provided at an upper end of the front shell, control keys are provided at a middle part of the front shell. The circuit board is provided with a decoding drive electrically connected with the display, and a single chip microcomputer unit is provided on and electrically connected to the decoding drive. The single chip microcomputer unit is electrically connected with the control keys. An air inlet connector and an air outlet connector are provided at and fixedly connected to a lower end of the front shell, an air inlet end of the manifold body is fixedly connected with the air inlet connector and an air outlet end of the manifold body is fixedly connected with the air outlet connector; two ends of the manifold body are provided with sensors which are electrically connected with the single chip microcomputer unit.

In some embodiments, a battery is also provided within the shell. and a battery box cover is provided on the rear shell, the battery box cover can be opened and closed.

In some embodiments, a backlight is provided at an inner side of the display, the backlight is electrically connected with the backlight through a conductive rubber.

In some embodiments, the display is provided with a serial number storage area, a display area for leakage rate Q of the front throttle hole chamber, a pressure unit display area and a display area for leakage rate Q of the rear throttle hole chamber, which are electrically connected in parallel with the decoding drive.

In some embodiments, the control keys include an on-off and conversion key, a storage and operation key, and a clear key which are electrically connected in parallel with the single chip microcomputer unit.

In some embodiments, the manifold body includes a front throttle hole chamber at the input end and a rear throttle hole chamber at the output end, the front throttle hole chamber is fixedly connected with the air inlet connector, and the rear throttle hole chamber is fixedly connected with the air outlet connector.

In some embodiments, the sensor includes a sensor A connected with the front throttle hole chamber and a sensor B connected with the rear throttle hole chamber.

In some embodiments, a protective rubber is arranged between the sensor A and the front throttle hole chamber, and a protective rubber is between the sensor B and the rear throttle hole chamber.

In some embodiments, a sealing ring is arranged between the sensor and the front throttle hole chamber, and a sealing ring is between the sensor B and the rear throttle hole chamber.

In some embodiments, an aperture of the throttle hole is 1 mm.

Compared with the prior art, the present disclosure has the following advantages: a structure of the present disclosure is simple, easy to operate and convenient to carry, and eliminates a pressure regulating valve necessary for a traditional detection instrument for cylinder leakage rate. With help of a single chip microcomputer unit, a decoding drive, a display and other functional components, a pressure sensor can read dynamic pressure data at high speed and calculate an average value. By one key operation, detection steps of leakage rate of a cylinder are simplified and detection efficiency is improved. Further, a pressure regulating valve is eliminated and product cost is reduced. The technology of automatic calculation, data storage and display is applied to a tester for cylinder leakage rate, which can store leakage rate data of all engine cylinders. According to present disclosure, it is very convenient for an operator to determine and compare performance of each cylinder of a generator, the operation steps are simplified and the product cost is reduced and a traditional method of using a mechanical pressure gauge as a pressure indicating device is avoided. The disclosure has better impact resistance, drop resistance and overload resistance, and is more simple, convenient and intuitive in observing readings.

List of reference numerals: 1 front shell; 2 rear shell; 21 battery box cover; 3 display; 31 serial number storage area; 32 display area for a leakage rate Q of a front throttle hole chamber; 33 pressure unit display area; 34 display area for a leakage rate Q of a rear throttle hole chamber; 35 backlight; 36 conductive rubber; 37 circuit board; 4 control key; 41 on-off and conversion key; 42 storage and operation key; 43 clear key; 5 manifold body; 51 throttle hole; 52 front throttle hole chamber; 53 rear throttle hole chamber; 6 sensor; 61 sensor A; 62 sensor B; 63 protective rubber; 7 sealing ring; 8 air inlet connector; 9 air outlet connector; 10 battery; 11 single chip microcomputer unit; 12 decoding drive.

DETAILED DESCRIPTION OF THE EMBODIMENTS

The following describes principles and features of the present disclosure in combination with the drawings. The examples cited are only for explaining the present disclosure, not for limiting the scope of the present disclosure.

Figure 1:
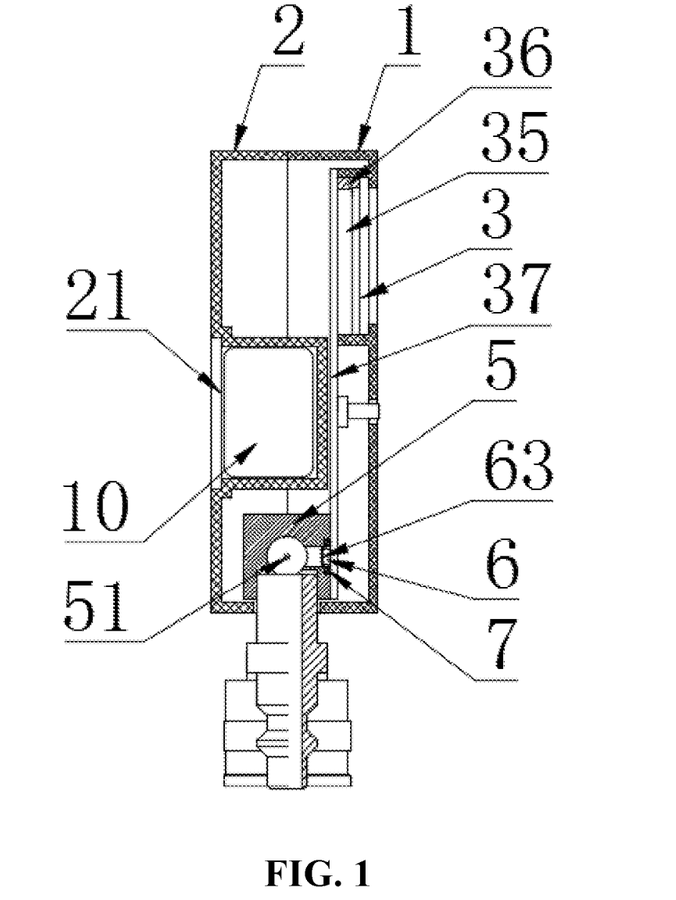
FIG. 1 is a left cross sectional view of a portable tester according to the present disclosure.
Figure 2:
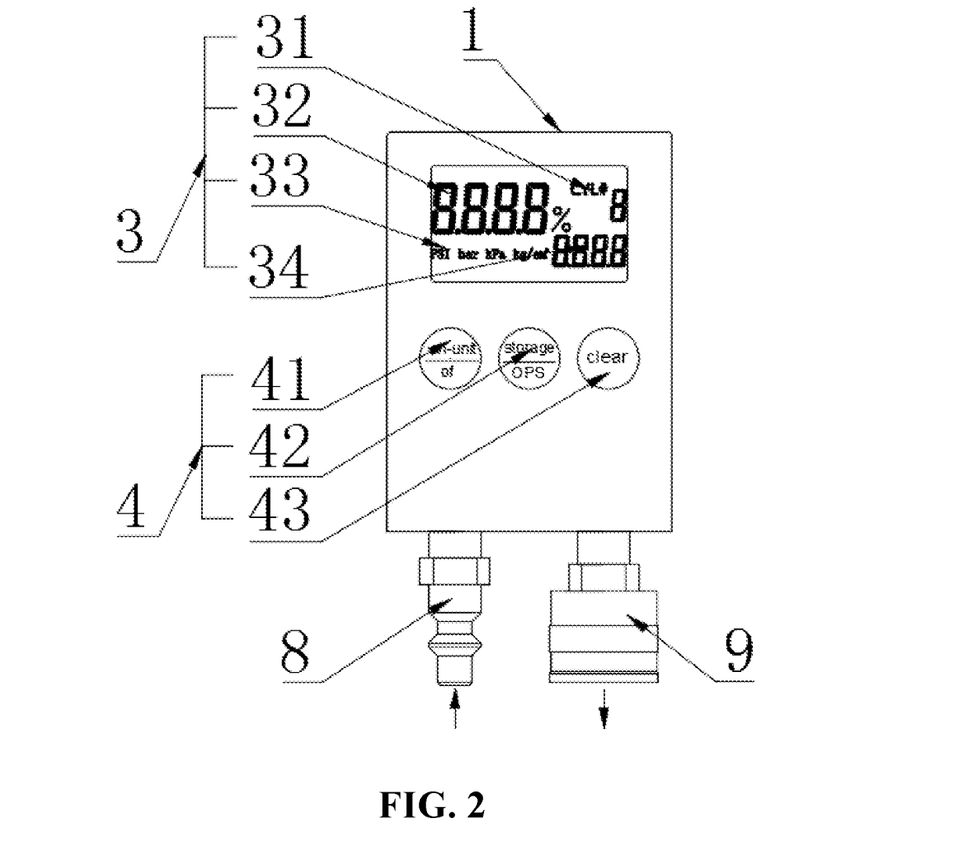
FIG. 2 is a front view of the portable tester according to the present disclosure.
Figure 3:
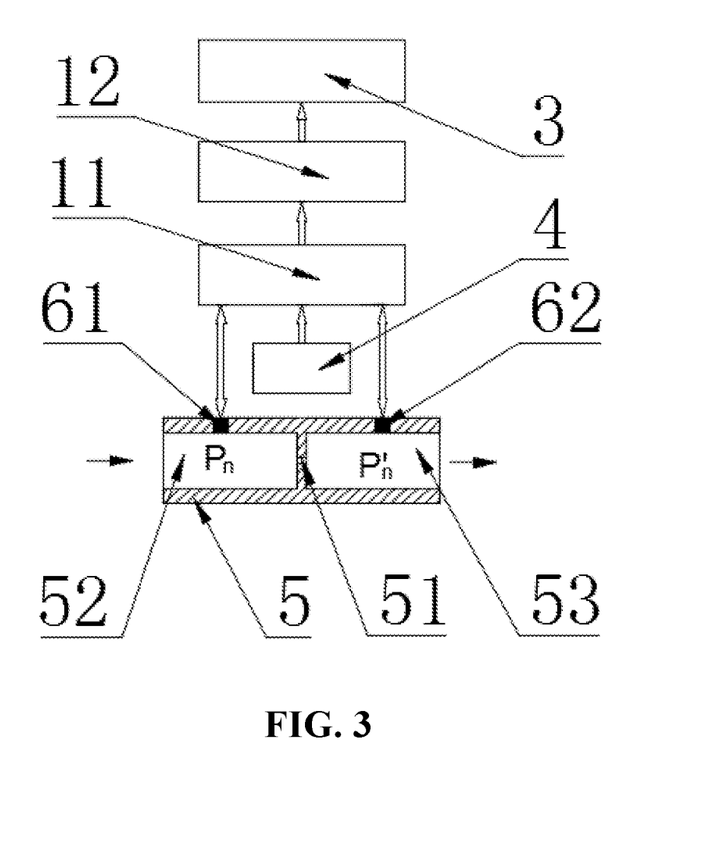
FIG. 3 is a schematic diagram of a control for the portable tester according to the present disclosure.
Figure 4:
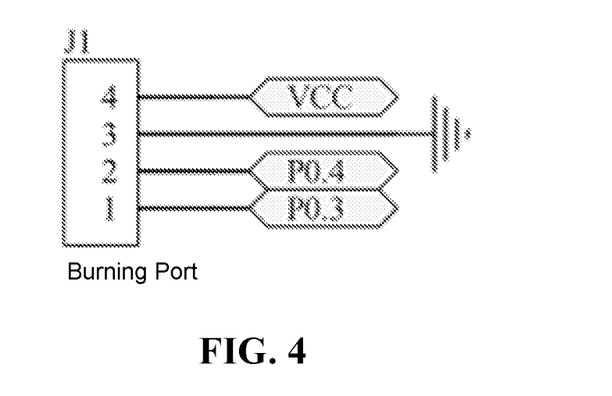
FIG. 4 is a schematic electrical diagram for the portable tester according to the present disclosure.
Figure 5:
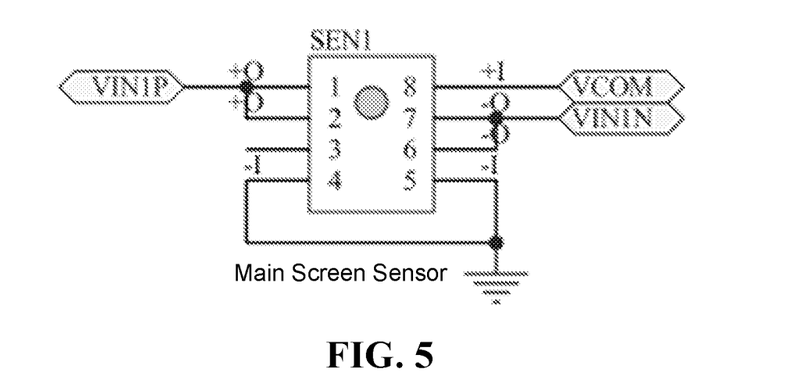
FIG. 5 is a schematic electrical diagram for the portable tester according to the present disclosure.
Figure 6:
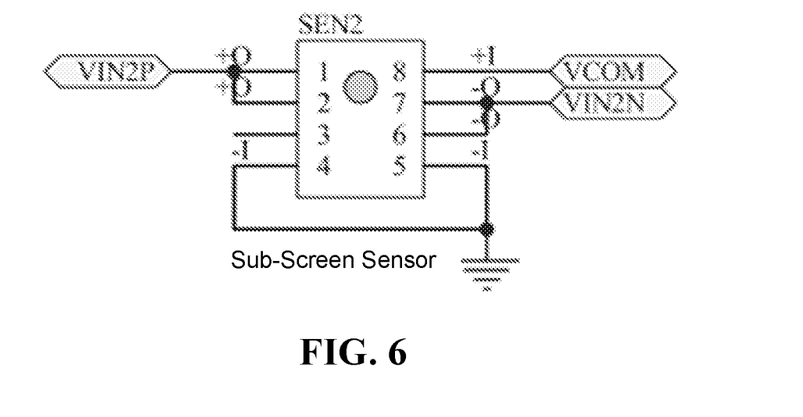
FIG. 6 is a schematic electrical diagram for the portable tester according to the present disclosure.
Figure 7:
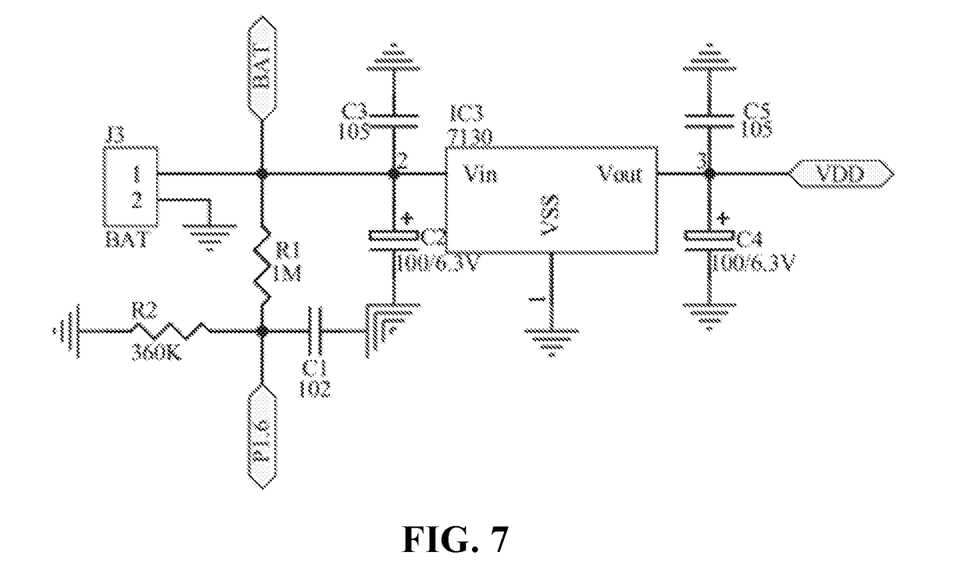
FIG. 7 is a schematic electrical diagram for the portable tester according to the present disclosure.
Figure 8:
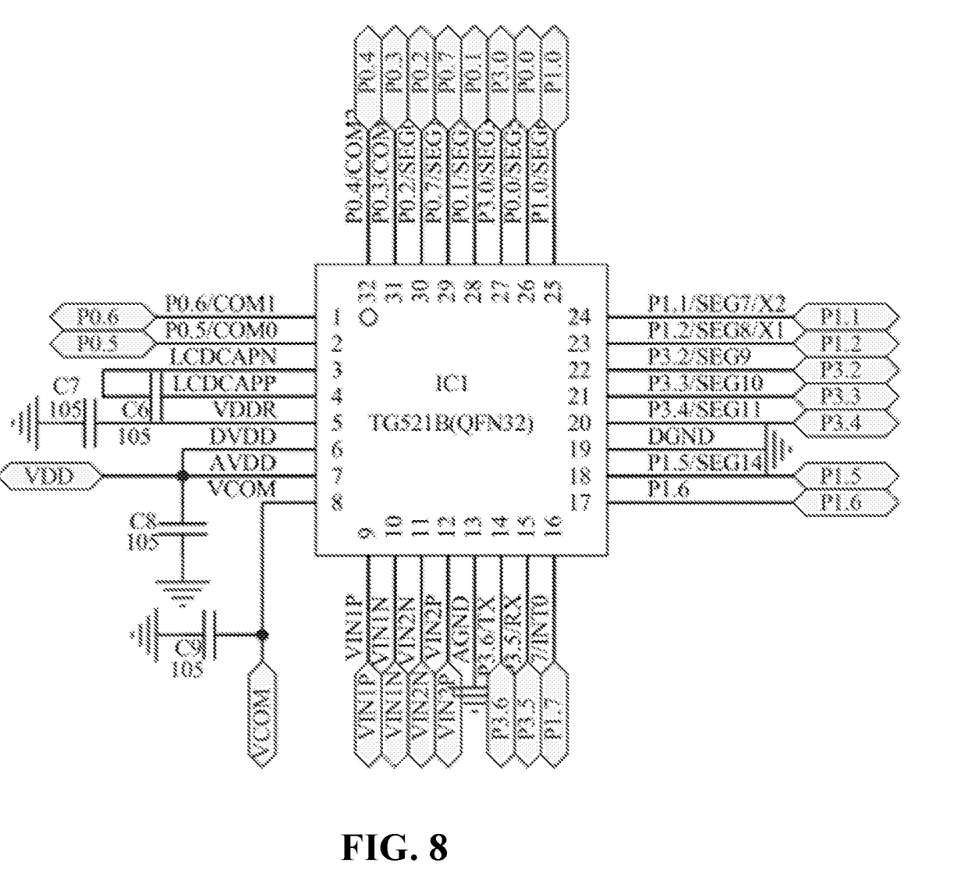
FIG. 8 is a schematic electrical diagram for the portable tester according to the present disclosure.
Figure 9:
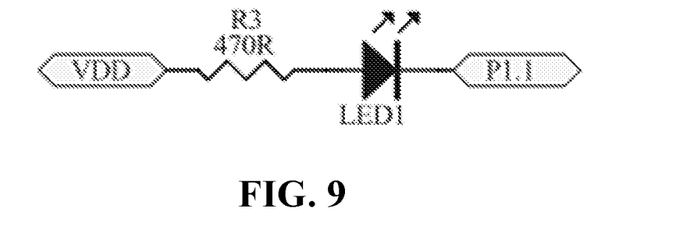
FIG. 9 is a schematic electrical diagram for the portable tester according to the present disclosure.
Figure 10:
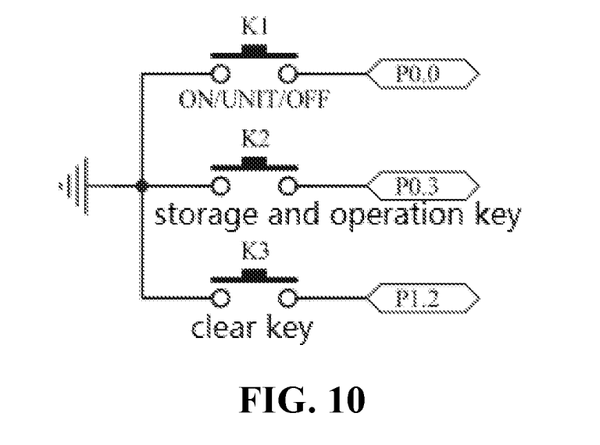
FIG. 10 is a schematic electrical diagram for the portable tester according to the present disclosure.
Figure 11:
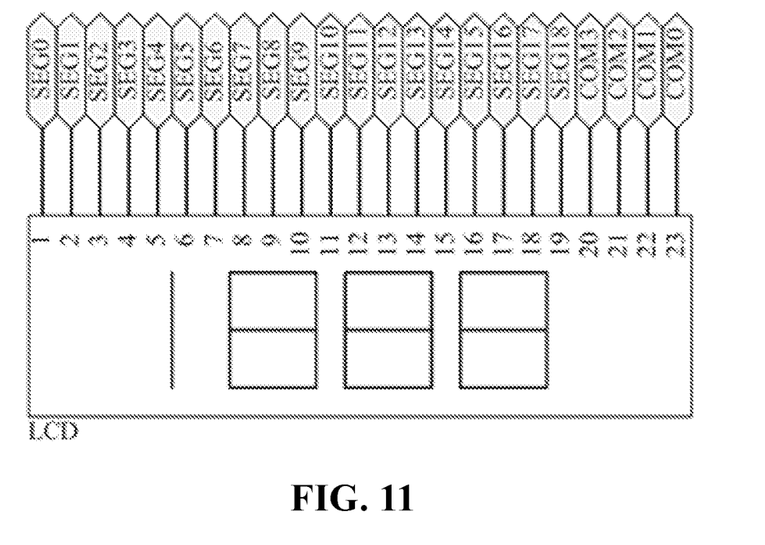
FIG. 11 is a schematic electrical diagram for the portable tester according to the present disclosure.
Figure 12:
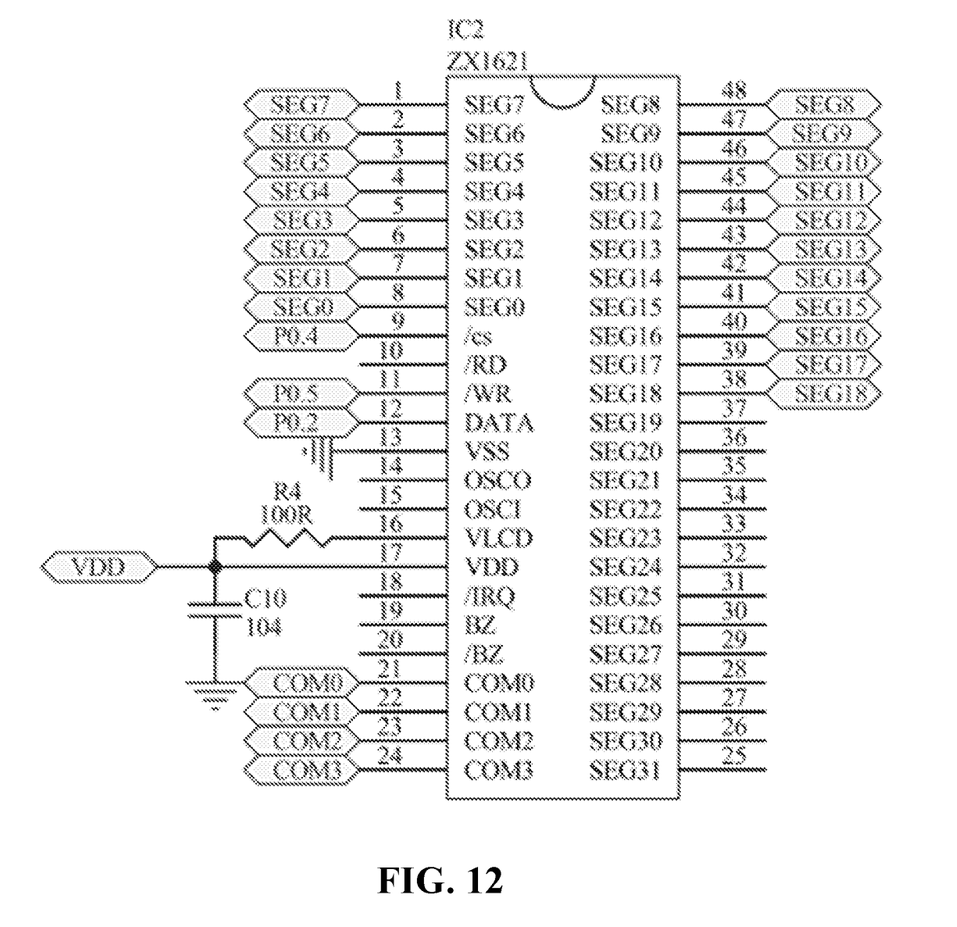
FIG. 12 is a schematic electrical diagram for the portable tester according to the present disclosure.

As shown in FIG. 1-FIG. 12, it is provided a portable tester for a leakage rate of a cylinder of an automobile engine, including a shell. A circuit board 37 and a manifold body 5 are arranged in the shell. A throttle hole 51 is arranged in the manifold body 5. The shell is composed of a front shell 1 and a rear shell 2. A display 3 is provided at an upper end of the front shell 1, control keys 4 are provided at a middle part of the front shell, and the circuit board 37 is provided with a decoding drive 12 electrically connected with the display 3. A single chip microcomputer unit 11 is electrically connected to the decoding drive 12, the single chip microcomputer unit 11 is electrically connected with the control keys 4. A lower end of the shell is fixedly connected with an air inlet connector 8 and an air outlet connector 9, and an air inlet end of the manifold body 5 is fixedly connected with the air inlet connector 8, an air outlet end of the manifold body 5 is fixedly connected with the air outlet connector 9. Both ends of the manifold body 5 are provided with a sensor 6, and the sensor 6 is electrically connected with the single chip microcomputer unit 11.

The shell is also provided with a battery 10, and the rear shell 2 is provided with a battery box cover 21 which can be opened and closed.

A backlight 35 is provided at an inner side of the display 3, the backlight is electrically connected with the display 3 through a conductive rubber 36.

The display 3 is provided with a serial number storage area 31, a display area 32 for a leakage rate Q of a front throttle hole chamber, a display area 33 for pressure unit and a display area 34 for a leakage rate Q of a rear throttle hole chamber, which are electrically connected in parallel with the decoding drive 12.

The control keys 4 includes an on-off and conversion key 41, a storage and operation key 42 and a clear key 43, which are electrically connected in parallel with the single chip microcomputer unit 11.

The manifold body 5 comprises a front throttle hole chamber 52 at an input end of the manifold body 5 and a rear throttle hole chamber 53 at an output end of the manifold body 5, the front throttle hole chamber 52 is fixedly connected with the air inlet connector 8, and the rear throttle hole chamber 53 is fixedly connected with the air outlet connector 9.

The sensor 6 includes a sensor A 61 connected with the front throttle hole chamber 52 and a sensor B 62 connected with the rear throttle hole chamber 53.

Protective rubbers 63 are arranged between the sensor A 61 and the front throttle hole chamber 52 and between the sensor B 62 and the rear throttle hole chamber 53 respectively.

Sealing rings 7 are arranged between the sensor A 61 and the front throttle hole chamber 52, and between the sensor B 62 and the rear throttle hole chamber 53 respectively.

An aperture of the throttle hole 51 is 1 mm.

According to the expression:

$$\text{Cylinder leakage rate } Q = \left(1 - \frac{(P_1 - P'_1) + (P_2 - P'_2) + \ldots + (P_n - P'_n)}{P_1 + P_2 + \ldots + P_n}\right) \times 100\%,$$

wherein n is a serial number of each sampling pressure value in a measurement cycle.

A mean pressure in the front throttle hole chamber 52 is expressed as:

$$\overline{P} = \frac{\sum P_N}{N}.$$

A mean pressure in the rear throttle hole chamber 53 is expressed as:

$$\overline{P'} = \frac{\sum P'_N}{N}.$$

Wherein n is a number of samples in each measurement cycle.

Compressed air enters the front throttle hole chamber 52 of the manifold body 5, then enters the rear throttle hole chamber 53 through the throttle hole 51, and then enters the tested engine cylinder. When a cylinder leakage amount is greater than air flow through throttle hole 51, a pressure P' in the rear throttle hole chamber 53 will be lower than a pressure P in the front throttle hole chamber 52. The difference value P–P' is directly proportional to the air leakage amounts of the cylinder. The technical solution is aimed to quickly detect values of P and P' for many times through functional components such as the sensor 6 and the single chip microcomputer unit 11, then calculates averages of the detected values of P and P', then calculate, display and store the leakage rate of the measured cylinder.

The analog electrical signals P and P' detected by the sensor A 61 and the sensor B 62 which reflect a magnitude of pressures, are transmitted to the single chip microcomputer unit 11. In each measurement cycle, the single chip microcomputer unit 11 samples the analog signals respectively from the two sensors 6 for several times to obtain the following sequences: P1, P2, P3 . . . Pn and P1', P2', P3' Pn', and through analog-to-digital conversion, a pressure average $\overline{P}$ of the front throttle hole chamber 52 and a pressure average $\overline{P'}$ of the rear throttle hole chamber 53 in each measurement cycle are obtained.

Through the decoding drive 12, the pressures of the two chambers are separately and respectively displayed on the display 3.

When performing an operation and storage command (press the storage and operation key 42), the single chip microcomputer unit 11 perform an arithmetic operation on the average pressure value $\overline{P}$ of the front throttle hole chamber 52, the average pressure value $\overline{P'}$ of the rear throttle hole chamber 53, and the sampling number N in one cycle to obtain a value of leakage rate Q of the cylinder, the value is stored, decoded and displayed on the display 3.

The structure is simple, easy to operate and carry and eliminates a pressure regulating valve necessary required for a traditional detection instrument of cylinder leakage rate. With the help of functional units such as the single chip microcomputer unit 11, the decoding drive 12 and the display 3, the pressure sensor 6 can read a dynamic pressure data and calculate an average value at high speed, instead of manually reading and calculating the recorded data after adjusting the pressure regulating valve to be stable as in the prior art method, thus the pressure in the manifold 5 need not to be adjusted repeatedly. By one key operation, steps of cylinder leakage rate detection are simplified and a detection efficiency is improved. Moreover, due to eliminating a pressure regulating valve and other reasons, the product cost sought to be protected by the present disclosure is lower than that of the product of the prior art, with higher cost performance ratio.

The specific operation steps of the tester are as follows: connecting an air source, a tester of the present disclosure and an engine cylinder to be tested; pressing an on-off and conversation key 41; and then pressing a storage and operation key 42 to implement the detection of leakage rate of the cylinder. The technology of automatic calculation, data storage and display is applied to the tester of leakage rate of the cylinder, enabling the leakage rate data of all engine cylinders to be stored. The process of observation, recording and calculation to be performed by an operator is implemented by instruments controlled by the single chip microcomputer unit 11. According to the present disclosure, it is very convenient for an operator to determine and compare performance of each cylinder of a generator. MEMS sensors are used in the system instead of traditional single function sensors, and costs of product design and manufacturing is greatly reduced. Because there is no need to repeatedly adjust the instrument, a one-way valve in the prior art is not provided in the technical solution, which further simplifies the operation steps, reduces the product cost, and avoid using mechanical pressure gauge as a pressure indicating device as in the traditional method. The system of the present disclosure has better impact resistance, drop resistance and overload resistance, and is more simple, convenient and intuitive in observing readings. A window of silicon MEMS sensor subject to a pressure and its surrounding area are coated with protective materials which can transmit pressure smoothly. The MEMS sensor has an ability to withstand a variety of corrosive media, and can meet requirements of more environments.

The above descriptions are only some embodiments of the present disclosure, and are not to limit the present disclosure. Any modification, equivalent replacement, improvement and so on made within spirit and principle of the present disclosure shall be included in the protection scope of the present disclosure.

What is claimed is:

1. A portable tester for a leakage rate of a cylinder in an automobile engine, comprising,
 a shell, having a front shell and a rear shell, wherein a circuit board and a manifold body are provided in the shell;
 a throttle hole provided inside the manifold body;
 a display provided at an upper end of the front shell;
 control keys provided at a middle part of the front shell, wherein the circuit board is provided with a decoding drive electrically connected with the display;
 a single chip microcomputer unit electrically connected with the control keys and provided on and electrically connected to the decoding drive;
 an air inlet connecter and an air outlet connector provided at and fixedly connected to a lower end of the front shell;
 an air inlet end of the manifold body fixedly connected with the air inlet connector; and
 an air outlet end of the manifold body fixedly connected with the air outlet connector,
 wherein the air inlet end and the air outlet end of the manifold body each are provided with sensors which are electrically connected with the single chip microcomputer unit,
 wherein the manifold body comprises a front throttle hole chamber at the air inlet end and a rear throttle hole chamber at the air outlet end, the sensors comprise a sensor A connected with the front throttle hole chamber and a sensor B connected with the rear throttle hole chamber,
 wherein the sensor A is configured to detect a first pressure P within the front throttle hole chamber, and the sensor B is configured to detect a second pressure P' within the rear throttle hole chamber,
 a pressure difference P–P' between the first pressure P and the second pressure P' is in direct proportion to the leakage rate of the cylinder, the leakage rate of the cylinder is calculated based on the first pressure P, the second pressure P' and the pressure difference P−P', and displayed.

2. The portable tester according to claim 1, wherein a backlight is provided at an inner side of the display, the backlight is electrically connected with the display through a conductive rubber.

3. The portable tester according to claim 1, wherein the display is provided with a serial number storage area, a display area for leakage rate Q of the front throttle hole chamber, a pressure unit display area and a display area for leakage rate Q of the rear throttle hole chamber, which are electrically connected in parallel with the decoding drive.

4. The portable tester according to claim 1, wherein the control keys comprises an on-off and conversion key, a storage and operation key and a clear key, which are electrically connected in parallel with the single chip microcomputer unit.

5. The portable tester according to claim 1, wherein an aperture of the throttle hole is 1 mm.

6. The portable tester according to claim 1, wherein the front throttle hole chamber is fixedly connected with the air inlet connector, and the rear throttle hole chamber is fixedly connected with the air outlet connector.

7. The portable tester according to claim 6, wherein respectively between the sensor A and the front throttle hole chamber and between the sensor B and the rear throttle hole chamber, a protective rubber is arranged.

8. The portable tester according to claim 6, wherein respectively between the sensor A and the front throttle hole chamber, and between the sensor B and the rear throttle hole chamber, a sealing ring is arranged.

9. The portable tester according to claim 1, wherein a battery is further provided within the shell, and a battery box cover which is able to be opened and closed, is provided on the rear shell.

10. The portable tester according to claim 9, wherein a backlight is provided at an inner side of the display, the backlight is electrically connected with the display through a conductive rubber.

11. The portable tester according to claim 9, wherein the display is provided with a serial number storage area, a display area for leakage rate Q of the front throttle hole chamber, a pressure unit display area and a display area for leakage rate Q of the rear throttle hole chamber, which are electrically connected in parallel with the decoding drive.

12. The portable tester according to claim 9, wherein the control keys comprises an on-off and conversion key, a storage and operation key and a clear key, which are electrically connected in parallel with the single chip microcomputer unit.

13. The portable tester according to claim 9, wherein an aperture of the throttle hole is 1 mm.

14. The portable tester according to claim 9, wherein the front throttle hole chamber is fixedly connected with the air inlet connector, and the rear throttle hole chamber is fixedly connected with the air outlet connector.

15. The portable tester according to claim 14, wherein respectively between the sensor A and the front throttle hole chamber and between the sensor B and the rear throttle hole chamber, a protective rubber is arranged.

16. The portable tester according to claim 14 wherein respectively between the sensor A and the front throttle hole chamber, and between the sensor B and the rear throttle hole chamber, a sealing ring is arranged.

* * * * *